Nov. 12, 1968   W. T. SOMMER   3,410,536
STIRRING MECHANISM
Filed July 7, 1967

INVENTOR
WARREN T. SOMMER
BY
Burton & Parker
ATTORNEYS

United States Patent Office 3,410,536
Patented Nov. 12, 1968

3,410,536
STIRRING MECHANISM
Warren T. Sommer, 601 Orleans, Apt. 13,
Detroit, Mich. 48207
Filed July 7, 1967, Ser. No. 651,758
9 Claims. (Cl. 259—111)

ABSTRACT OF THE DISCLOSURE

This disclosure relates to mechanical stirring device having a drive mechanism which traverses the rim of the container, which drives a stirring means which extends from the drive mechanism into the container or vessel.

---

The stirring device of this invention is particularly, although not exclusively adapted to stirring relative viscous fluids in a generally cylindrical container, such as a conventional domestic cooking vessel, pot or pan. More particularly, the stirring device of this invention is adapted to stir low to medium viscosity foods, such as soups or puddings, while they are being heated, to prevent scorching or burning.

The most common stirring devices shown by the prior art include a drive means which is suspended on the receptacle or container rim or cover, and drive a rotating or oscillating blade or paddle. Examples of such devices include the following United States Patents: 3,251,581, 3,112,917, 2,831,663, 2,032,678. It is noted that United States Patents 2,831,663 and 2,032,678 do illustrate commercial mixing devices which traverse the rim of a conical container, or traverse tracks provided in the receptacle rim, respectively, however these devices are not adapted for domestic use, and rely upon rotating members to provide the stirring or agitating action.

United States Patents 2,732,185 and 2,456,981 are cited herein to show a very simple and a very complex agitating device for domestic cooking vessels, to illustrate the approach taken by others in this field.

Brief summary of the invention

Briefly, the stirring device of this invention includes a drive means or mechanism adapted to traverse the rim of a conventional cooking vessel and a stirring means adapted to shift with the drive means to scrape the vessel walls and stir the fluid contained therein. The drive means is preferably an AC or DC motor, but the stirring device of this invention may also utilize a spring driven drive means, or the like. The drive shaft, or a power driven extension of the drive shaft is supported for rotation on the container rim.

In the disclosed embodiment of my invention, the drive means is supported over the top of the vessel by a conical extension of the drive shaft to prevent migration of the shaft as it rotates along the rim. The stirring means includes a generally right-angle shaft which extends from the drive means, adjacent the container wall, to overlie the bottom of the container. The bottom or lower shaft also aids in balancing the drive means on the container rim. In the preferred embodiment, the shaft is adjustable in height on the drive means to accommodate various container depths. The shaft is provided with a scraper adapted to make contact with the bottom of the container adjacent the side edge to prevent accumulation of relative viscous fluids adjacent the container side wall. It is important to note that conventional rotating-blade stirring devices merely force the fluid against the side wall, which causes burning of medium viscosity fluids, such as cereals and puddings. The stirring device of this invention is particularly suitable to stirring such fluids, because the scraper is shifted along the inner edge of the bottom wall and prevents scorching at this critical surface.

The bottom shaft may also be provided with a cross blade, which is adjustable on the shaft to position the intersection of the blade and the shaft substantially at the center of a cylindrical pan or vessel. The cross blade cooperates with the scraper to stir the fluid as the shaft if rotated about the bottom wall.

The stirring device of this invention is relatively simple in construction, yet provides a stirrer suitable for domestic use which will prevent scorching of foods which normally burn if left unattended even for brief periods of time. The stirring mechanism is easily adaptable to various sizes and types of cooking vessels and is simple to operate.

Other objects, advantages, and meritorious features of this invention will more fully appear from the following specification, claims, and accompanying drawings, wherein:

Figure 1:
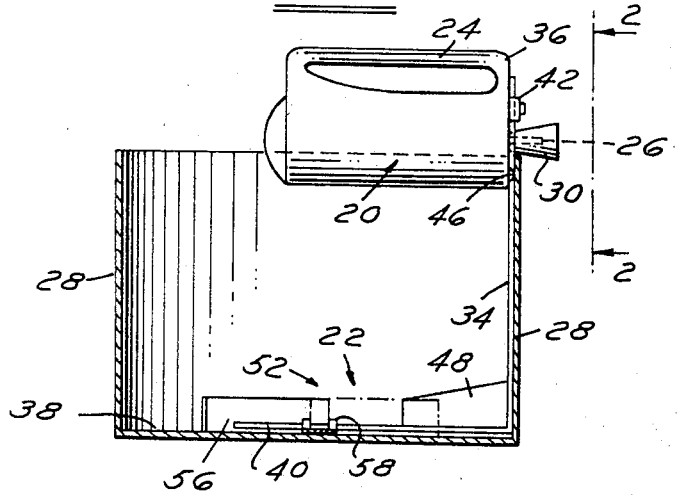
FIG. 1 is a side elevation of the stirring device of this invention received in a cooking vessel which has been cross sectioned to illustrate the function of the stirrer.
Figure 2:
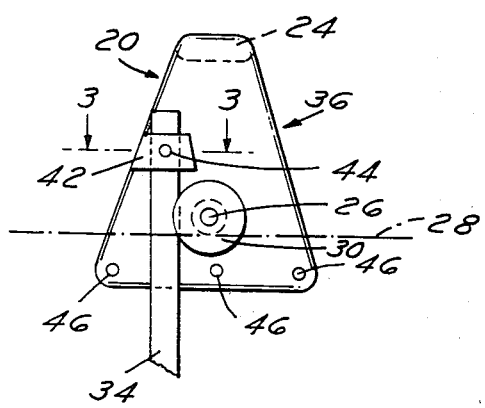
FIG. 2 is an end view of the drive means and a portion of the stirring means in the direction of view arrows 2—2 of FIG. 1.
Figure 3:
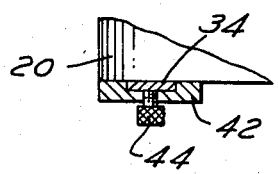
FIG. 3 is a partial cross-sectional view of FIG. 2 in the direction of view arrows 3—3.

In the embodiment of my invention illustrated in the drawings, the stirring device includes a self-contained drive mechanism 20 and a stirring means indicated generally at 22. The drive means in this embodiment is a battery operated D.C. motor, however other drive means are also satisfactory as described hereinabove. The motor case may be provided with a handle 24, and contains batteries which are not shown.

The drive shaft 26 is supported on the container side wall 28. In this embodiment, the drive shaft is provided with a conical supporting member 30 which rotates with the drive shaft to cause the motor 20 to traverse the rim of the vessel. The supporting member 30 in this embodiment is conical to prevent migration of the rotating support from the rim. The supporting member may be plastic or metal, and may be attached to the shaft 26 by any suitable means, as by a set screw or the like.

Figure 4:
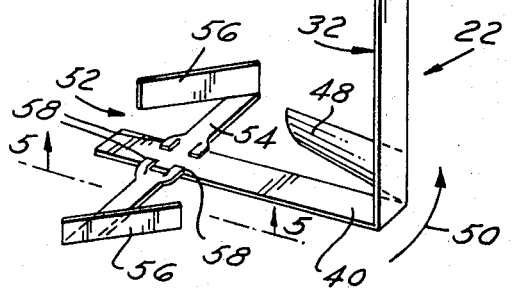
FIG. 4 is a top perspective view of the stirring means shown in FIG. 1.

The stirring means 22, best shown in FIGURE 4, includes a generally right angle shaft 32. The side leg 34 is adapted to extend from the end 36 of the drive means to the bottom 38 of the vessel, adjacent the inner side wall. The opposite or bottom leg 40 of the shaft overlies the bottom wall of the vessel. In this embodiment, the bottom leg 40 also aids in balancing the drive means on the rim of the container, as described hereinafter. The side leg 34 is preferably adjustably secured to the drive means to accommodate various pan or cooking vessel depths. For this purpose, the side leg of the shaft is slidably received in a clamp 42, secured to the end 36 of the motor housing, and is locked in position by a set screw 44, or other suitable means. The end 36 of the motor housing may be provided with nylon or Teflon bumpers 46 to protect the surface of the vessel, and reduce the frictional drag of the motor housing as it rides against the side wall of the vessel.

The stirring means of this embodiment is provided with a scraper 48 secured by any suitable means to the side leg 34 of the shaft. The scraper is preferably resilient, and is positioned to contact the bottom wall of the vessel adjacent the side 28 to circulate the fluid toward the center of the vessel. The direction of travel of the stirring means is indicated by arrows 50 in FIGURES 4 and 5. It is noted that the scraper rotates about an axis defined near the end of the lower arm, and thereby effectively agitates fluid at the outer edge of the bottom wall of the vessel. This action should be distinguished from a conventional rotating blade mixer, or stirring means, which merely forces fluid from the axis of the mixer against the side wall, causing such relatively viscus fluids as pudding, etc., to scorch, as described hereinabove.

Figure 5:
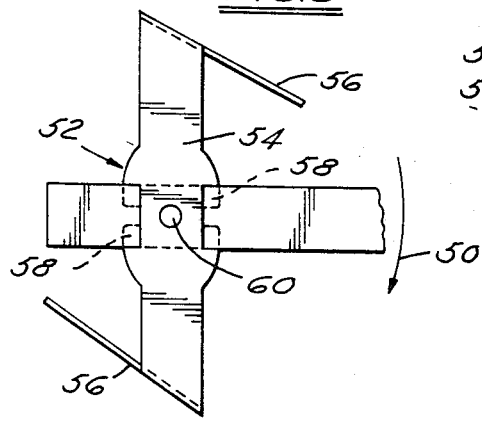
FIG. 5 is a bottom view of a portion of the stirring means in the direction of view arrows 5—5 in FIG. 4.

The bottom shaft, in this embodiment of my invention, is also provided with a cross-blade 52 which rotates with the shaft 32 to stir fluid near the center of the vessel. The cross-blade includes a cross arm 54, generally perpendicular to the bottom arm 40 of the shaft, and a pair of generally parallel upstanding blades 56. The blades 56 are positioned at an angle to improve the stirring action. The cross-blade is slidably received on the bottom arm of the shaft, and is retained thereon by four tabs 58 struck from the cross-arm, however other clamping arrangements have been found satisfactory. The cross-blade may be adjusted on the lower arm to position the central nub 60, as shown in FIGURE 5, substantially at the center of a cylindrical vessel. The central nub thus serves as the center of rotation for the stirrer as a whole, and aids in balancing the drive means on the vessel rim. The central nub 60 is preferably made from a friction resistant material, such as nylon or Teflon, for the same reason as the bumpers 46. It is noted that the blades in this embodiment do not contact the bottom wall of the vessel 38, but provide effective circulation of the fluid by rotation of the upstanding blades 56. The blades may however be modified to provide a scraping action if desired.

The elements of the mixing device of my invention may be made from various materials. For example, the stirring means 22, including the shaft 32 and the cross blade 52, may be easily formed from sheet metal, or relatively rigid plastics. The blades 56 may be integral with the cross arm 54, as shown, or may be formed separately. The scraper 48 may be formed from a resilient single piece of plastic, or may be sheet metal with a resilient plastic scraper edge. The conical supporting member 30 may be formed from a synthetic rubber material, or may be made from various plastics or metal. If metal is used, the conical surface is preferably serrated to insure frictional engagement with the rim of the container, during rotation. The motor housing may be plastic or metal as desired. It is noted that several motor driven domestic implements are presently commercially available, such as beaters, knife sharpeners, etc., and the mixing means of this invention may easily be removed from the motor to allow use in such other implements.

It will be obvious to those skilled in the art that various modifications may be made to the mixing device of this invention without departing from the purview of the appended claims. For example, the cross blade 52 of the stirring means may be substituted for a more conventional stirring blade or assembly. Further, various forms and configurations of the drive means 20 may be utilized.

What is claimed is:

1. A mechanical stirring device for stirring fluids in a container, comprising: a drive mechanism, and a stirring means adapted to extend from said drive mechanism into a container having fluid to be stirred, said drive mechanism having a rotatable drive means including a supporting member adapted to be received on the edge of a container and rotatable with said drive means to cause said drive mechanism to traverse the edge of the container and drive said stirring means and said stirring means adapted to engage a wall of the container spaced below the edge to balance said supporting member on the container edge.

2. The mechanical stirring device defined in claim 1, characterized in that said stirring means is adapted to engage the bottom wall of the container to balance said supporting member on the container rim.

3. The mechanical stirring device defined in claim 1, characterized in that said supporting member is generally conical and the greater diameter end of the extension is adapted to extend over the edge of the container wall to prevent the extension from slipping off the edge of the container.

4. The mechanical stirring device defined in claim 1, characterized in that said drive mechanism is adapted to extend from adjacent the edge of the container wall above the container, and said stirring means is operably secured to said drive mechanism and is adapted to extend from adjacent the inner edge of the container to the bottom wall thereof.

5. The mechanical stirring device defined in claim 4, characterized in that said stirring means includes a generally right angle shaft with one leg of the shaft adapted to be received adjacent the inner container wall and the other leg is adapted to extend along the bottom thereof, said one leg adjustable in length to accomodate various container depths.

6. The mechanical stirring device defined in claim 4, characterized in that said stirring means includes a scraper adapted to extend from adjacent the container wall along the bottom thereof at an acute angle relative to the horizontal axis of the container.

7. A mechanical stirring device for stirring fluids in a container, comprising: a drive mechanism having a rotatable supporting member receivable on the container edge to traverse therealong, and a stirring means operably secured to said drive mechanism having a first shaft adapted to extend into the container adjacent the inner wall thereof and a second shaft adapted to overlie the bottom of the container, said second shaft including a scraper adapted to agitate the fluid in the container as the stirring means traverses the inner wall thereof.

8. The mechanical stirring device of claim 7, characterized in that said second shaft balances said supporting member on the rim of the container.

9. The mechanical stirring device defined in claim 7, characterized in that said second shaft includes a generally perpendicular shaft adjustably secured thereon including a stirring blade adapted to agitate the fluid in the container, said perpendicular shaft adjustable on said second shaft to position said perpendicular shaft generally at the center of the container.

References Cited

UNITED STATES PATENTS

| | | | |
|---|---|---|---|
| 1,133,168 | 3/1915 | Colson | 99—348 |
| 1,162,641 | 11/1915 | Muller | 99—348 |
| 2,032,678 | 3/1936 | Wegener | 259—102 |
| 3,251,581 | 5/1966 | Jensen | 259—108 |
| 3,272,480 | 9/1966 | Sukup | 259—111 |

ROBERT W. JENKINS, *Primary Examiner.*